(12) United States Patent
Storti et al.

(10) Patent No.: US 10,960,712 B2
(45) Date of Patent: Mar. 30, 2021

(54) TIRE WEAR ESTIMATION USING A HYBRID MACHINE LEARNING SYSTEM AND METHOD

(71) Applicant: Nissan North America, Inc., Franklin, TN (US)

(72) Inventors: Gian Luca Storti, San Jose, CA (US); Mumtaz Vauhkonen, Mountain View, CA (US); Gregory D. Dibb, Sunnyvale, CA (US)

(73) Assignee: Nissan North America, Inc., Franklin, TN (US)

( * ) Notice: Subject to any disclaimer, the term of this patent is extended or adjusted under 35 U.S.C. 154(b) by 293 days.

(21) Appl. No.: 16/022,032

(22) Filed: Jun. 28, 2018

(65) Prior Publication Data
US 2020/0001662 A1    Jan. 2, 2020

(51) Int. Cl.
*B60C 11/24*    (2006.01)
*G07C 5/08*    (2006.01)
*G06N 20/00*    (2019.01)

(52) U.S. Cl.
CPC .......... *B60C 11/246* (2013.01); *G07C 5/0808* (2013.01); *G07C 5/0825* (2013.01); *G06N 20/00* (2019.01)

(58) Field of Classification Search
CPC ... B60C 11/246; G07C 5/0808; G07C 5/0825; G06N 20/00
See application file for complete search history.

(56) References Cited

U.S. PATENT DOCUMENTS

| 8,493,200 B2 | 7/2013 | Wakao et al. |
| 2004/0172181 A1* | 9/2004 | Lu .................... B60C 23/061 701/36 |
| 2005/0005692 A1 | 1/2005 | Giustino |
| 2006/0090558 A1 | 5/2006 | Raskas |
| 2006/0208902 A1 | 9/2006 | Brey |
| 2015/0158347 A1 | 6/2015 | Fritz et al. |

(Continued)

OTHER PUBLICATIONS

Pombo et al. "A study on wear evaluation of railway wheels based on multibody dynamics and 1-19 wear computation." In: Multibody System Dynamics. Aug. 13, 2010 (Aug. 13, 2010) Retrieved on May 5, 2019 (May 5, 2019) from <http://eprints.whiterose.ac.Uk/42643/2/Lewis_42643.pdf> entire document.

*Primary Examiner* — Donald J Wallace
(74) *Attorney, Agent, or Firm* — Young Basile Hanlon & MacFarlane, P.C.

(57) ABSTRACT

A tire tread wear system may include one or more vehicle sensors and a processor. The processor may include a control module, a geometrical model, a machine learning model, and a switch. The geometrical model may be configured to collect data from the vehicle sensors to determine a dynamic rolling radius of a tire. The geometrical model may be configured to output a tread wear estimation based on the dynamic rolling radius of the tire. The machine learning model may be configured to collect data from the vehicle sensors. The machine learning model may be configured to output a tread wear estimation based on a correlation of the tread wear estimation output from the geometrical model and one or more data instances with a tire tread state. The switch may be configured to activate the geometrical model, the machine learning model, or a combination thereof.

19 Claims, 6 Drawing Sheets

(56) References Cited

U.S. PATENT DOCUMENTS

| | | | |
|---|---|---|---|
| 2015/0239298 A1 | 8/2015 | Kretschmann | |
| 2015/0375584 A1* | 12/2015 | Makino | B60C 11/246 |
| | | | 703/6 |
| 2016/0033367 A1 | 2/2016 | Unterreiner et al. | |
| 2016/0084869 A1* | 3/2016 | Yuen | A61B 5/681 |
| | | | 73/510 |
| 2016/0129737 A1* | 5/2016 | Singh | G01G 19/086 |
| | | | 73/146.3 |
| 2017/0023441 A1 | 1/2017 | Luk et al. | |
| 2017/0113494 A1* | 4/2017 | Singh | B60C 11/246 |
| 2018/0003593 A1* | 1/2018 | Siegel | B60C 23/02 |
| 2018/0268532 A1* | 9/2018 | Wang | B60C 11/246 |
| 2019/0001757 A1* | 1/2019 | Singh | B60C 11/246 |
| 2019/0227528 A1* | 7/2019 | Abbott | G05B 13/0265 |
| 2019/0255891 A1* | 8/2019 | Makke | G07C 5/0816 |
| 2019/0324431 A1* | 10/2019 | Cella | H04B 17/309 |
| 2019/0378353 A1* | 12/2019 | Mylaraswamy | G07C 5/0858 |

* cited by examiner

TIRE WEAR ESTIMATION USING A HYBRID MACHINE LEARNING SYSTEM AND METHOD

TECHNICAL FIELD

This disclosure relates to vehicle operational management.

BACKGROUND

Typical approaches for tire tread estimation may be classified into two groups. The first group uses additional sensors that are not present in a current production vehicle, and the second group uses commercially available sensors. The use of additional sensors increases complexity and cost while generally providing better accuracy. The use of commercially available sensors generally does not provide reliable results in tire tread estimation. Ultimately, it would be desirable to have an accurate and cost-effective system to determine tire tread wear without the need for additional sensors.

SUMMARY

Disclosed herein are aspects, features, elements, implementations, and embodiments of systems and methods for vehicle operational management.

A tire tread wear system may include one or more vehicle sensors and a processor. The processor may include a control module, a geometrical model, a machine learning model, and a switch.

The control module may be configured to determine a tire event. The geometrical model may be configured to collect data from the one or more vehicle sensors to determine a dynamic rolling radius of a tire. The geometrical model may be configured to output a tread wear estimation based on the dynamic rolling radius of the tire. The machine learning model may be configured to collect data from the one or more vehicle sensors. The machine learning model may be configured to output a tread wear estimation based on a correlation of the tread wear estimation output from the geometrical model and one or more data instances with a tire tread state. The switch may be configured to activate the geometrical model, the machine learning model, or a combination thereof. In some embodiments, the switch may be a logic switch.

The control module of the tire tread wear system may be configured to activate the geometrical model based on a determination that the tire event is an initial tire setup. In some embodiments, the switch may be configured to activate the machine learning model on a condition that the control module determines that the tire event is a tire change. In some embodiments, the switch may be configured to deactivate the geometrical model.

In some embodiments, the geometrical model of the tire tread wear system may be configured to collect data on a condition that the vehicle is at a constant speed. In some embodiments, the machine learning model of the tire tread wear system may be configured to collect data continuously and independently from a speed of the vehicle.

In some embodiments, the data collected by the geometrical model may include global positioning system (GPS) data, wheel velocity data, or a combination thereof. In some embodiments, the data collected by the machine learning model may include wheel velocity data, steering wheel angle data, brake pressure data, longitudinal acceleration data, total distance data, or any combination thereof.

In some embodiments, the machine learning model may utilize a multi-class support vector machine (SVM) with a radian kernel to predict the tire tread state. The tire tread state may be used to classify each tire into a group. For example, a first group may be for tires that have 100% tread remaining, a second group may be for tires that have 75% tread remaining, a third group may be for tires that have 50% tread remaining, and a fourth group may be for tires that have 25% tread remaining.

The tire tread wear system may include a display. The display may be configured to receive the geometrical model tread wear estimation and the machine learning model tread wear estimation. In response, the display may be configured to generate a visualization for the tire based on the geometrical model tread wear estimation and the machine learning model. The display may be configured to display the generated visualization for the tire.

In another aspect, a tire tread wear system may include one or more sensors and a processor. The processor may include a control module, a geometrical model, a machine learning model, a switch, and a display.

The control module may be configured to determine a tire state of a vehicle. The geometrical model may be configured to collect data from the one or more vehicle sensors to determine a dynamic rolling radius of a tire. The geometrical model may be configured to output a tread wear estimation based on the dynamic rolling radius of the tire. The machine learning model may be configured to collect data from the one or more vehicle sensors. The machine learning model may be configured to output a tread wear estimation based on a correlation of the tread wear estimation output from the geometrical model and one or more data instances with a tire tread state. The switch may be configured to activate the geometrical model, the machine learning model, or a combination thereof.

The display may be configured to receive the geometrical model tread wear estimation, the machine learning model tread wear estimation, or a combination thereof. The display may be configured to generate a visualization for the tire. The visualization may be based on the geometrical model tread wear estimation, the machine learning model tread wear estimation, or a combination thereof. The display may be configured to display the generated visualization for the tire.

In some embodiments, the control module of the tire tread wear system may be configured to activate the geometrical model based on a determination that the tire event is an initial tire setup. In some embodiments, the switch may be configured to activate the machine learning model on a condition that the control module determines that the tire event is a tire change. In some embodiments, the may be configured to deactivate the geometrical model.

In some embodiments, the data collected by the geometrical model may include global positioning system (GPS) data, wheel velocity data, or a combination thereof. In some embodiments, the data collected by the machine learning model may include wheel velocity data, steering wheel angle data, brake pressure data, longitudinal acceleration data, total distance data, or any combination thereof.

In some embodiments, the machine learning model may utilize a multi-class SVM with a radian kernel to predict the tire tread state. The machine learning model may be configured to classify the tire tread state into a group. For example, a first group may include tires that have 100% tread remaining, a second group may include tires that have 75% tread remaining, a third group may include tires that have 50% tread remaining, and a fourth group may include tires that have 25% tread remaining.

In another aspect, a tire tread wear system may include one or more vehicle sensors, a wireless modem, a server, and a display. The wireless modem may be configured to transmit data received from one or more of the vehicle sensors.

The server may be configured to receive the data from the wireless modem. The server may include a receiver, a control module, a geometrical model, a machine learning model, a switch, and a transmitter. In some embodiments, the receiver and the transmitter may be combined into a single transceiver unit.

The control module may be configured to determine a tire state of a vehicle. The geometrical model may be configured to collect data from the one or more vehicle sensors to determine a dynamic rolling radius of a tire. The geometrical model may be configured to output a tread wear estimation based on the dynamic rolling radius of the tire. The machine learning model may be configured to collect data from the one or more vehicle sensors. The machine learning model may be configured to output a tread wear estimation based on a correlation of the tread wear estimation output from the geometrical model and one or more data instances with a tire tread state. The switch may be configured to activate the geometrical model, the machine learning model, or a combination thereof. The switch may be a logic switch.

Variations in these and other aspects, features, elements, implementations, and embodiments of the methods, apparatuses, procedures, and algorithms disclosed herein are described in further detail hereinafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
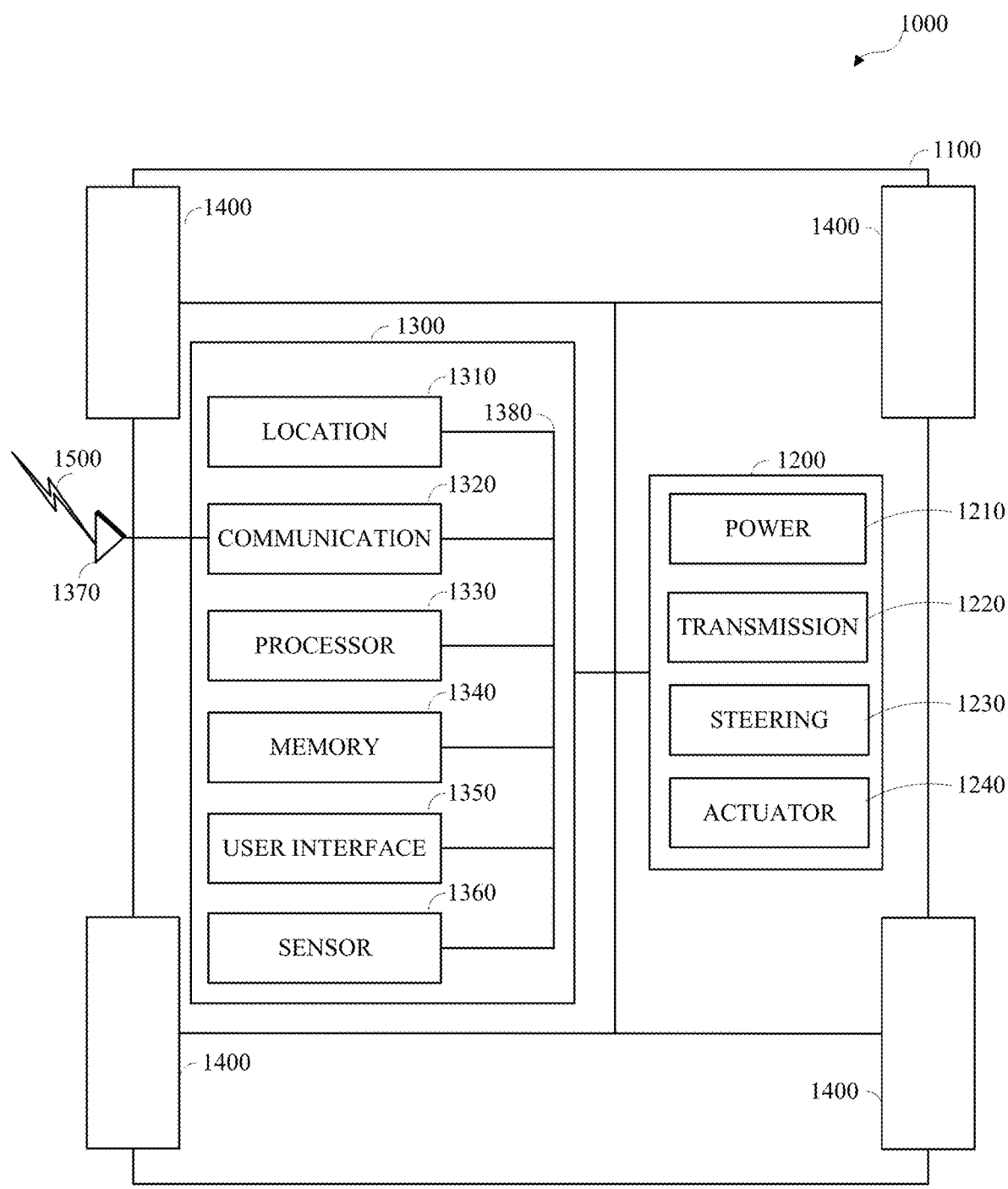
FIG. 1 is a diagram of an example of a vehicle in which the aspects, features, and elements disclosed herein may be implemented.

A vehicle may include one or more sensors for generating or capturing sensor data, such as data corresponding to an operational environment of the vehicle, or a portion thereof. For example, the sensor data may include information corresponding to one or more external objects, such as pedestrians, remote vehicles, other objects within the vehicle operational environment, a vehicle transportation network geometry, or a combination thereof.

As used herein, the terminology "computer" or "computing device" includes any unit, or combination of units, capable of performing any method, or any portion or portions thereof, disclosed herein.

As used herein, the terminology "processor" indicates one or more processors, such as one or more special-purpose processors, one or more digital signal processors, one or more microprocessors, one or more controllers, one or more microcontrollers, one or more application processors, one or more Application Specific Integrated Circuits, one or more Application Specific Standard Products, one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random-access memories (RAM), one or more registers, one or more low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special-purpose processor, or circuitry, that may include specialized hardware for carrying out any of the methods, algorithms, aspects, or combinations thereof, as described herein. In some implementations, portions of the instructions may be distributed across multiple processors on a single device, or across multiple processors on multiple devices that may communicate directly or across a network, such as a local area network, a wide area network, the Internet, or a combination thereof.

As used herein, the terminology "example," "embodiment," "implementation," "aspect," "feature," or "element" indicates serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a vehicle in which the aspects, features, and elements disclosed herein may be implemented. As shown, a vehicle 1000 includes a chassis 1100, a powertrain 1200, a controller 1300, wheels 1400, and may include any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals; power, such as electrical power or torque; or both information and power may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), or lithium-ion (Li-ion) batteries; solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300, the actuator 1240, or both. The steering unit 1230 may be controlled by the controller 1300, the actuator 1240, or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

The controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and the processor 1330 may be integrated in a first physical unit, and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices, now-existing or hereafter developed, capable of manipulating or processing a signal or other information, including optical processors, quantum processors, molecular processors, or a combination thereof. For example, the processor 1330 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium capable of, for example, containing, storing, communicating, or transporting machine readable instructions, or any information associated therewith, for use by or in connection with the processor 1330. The memory 1340 may be, for example, one or more solid-state drives, one or more memory cards, one or more removable media, one or more read-only memories, one or more random-access memories, one or more disks (including a hard disk, a floppy disk, an optical disk), a magnetic or optical card, or any type of non-transitory media suitable for storing electronic information, or any combination thereof.

The communication interface 1370 may be a wireless antenna (as shown), a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. The communication unit 1320 may include a dedicated short-range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device (such as an eye-tracking device), a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that is operable to report information regarding some aspect of the current dynamic situation of the vehicle 1000.

The sensors 1360 may include sensors that are operable to obtain information regarding the physical environment surrounding the vehicle 1000. For example, one or more sensors may detect road geometry and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. For example, the controller 1300 may include the trajectory controller. The trajectory controller may be operable to obtain information describing a current state of the vehicle 1000, a route planned for the vehicle 1000, or a combination thereof. Based on this information, the trajectory controller may determine and optimize a trajectory for the vehicle 1000. The trajectory controller may output signals operable to control the vehicle 1000 such that the vehicle 1000 follows the trajectory that is determined by the trajectory controller. In another example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

Figure 2:
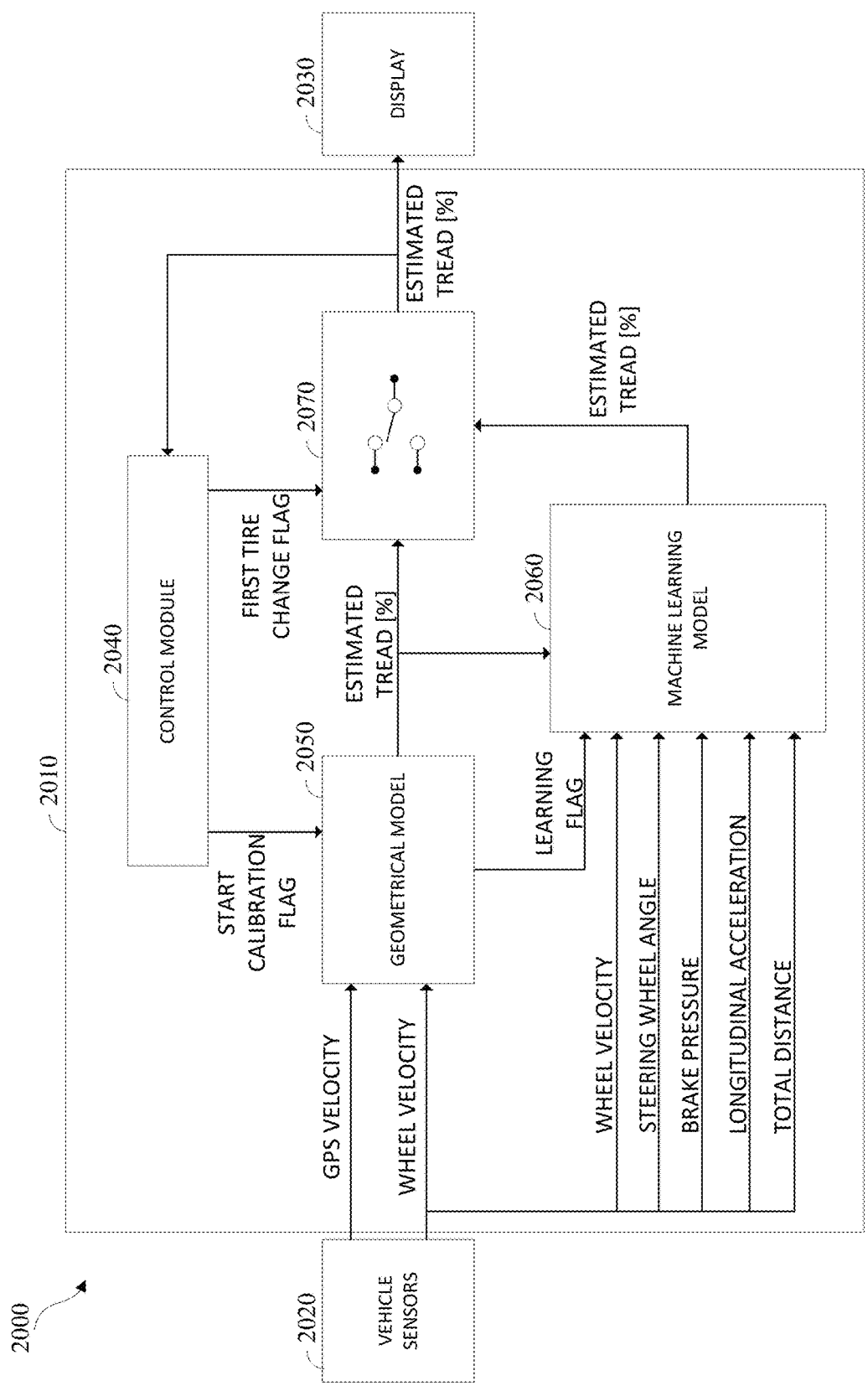
FIG. 2 is a diagram of an example of a portion of a vehicle communication system in which the aspects, features, and elements disclosed herein may be implemented.

FIG. 2 is a diagram of an example of a portion of a vehicle communication system 2000 in which the aspects, features, and elements disclosed herein may be implemented, for example in the vehicle 1000 shown in FIG. 1. In this example, the portion of the vehicle communication system 2000 includes a communication unit 2010, one or more vehicle sensors 2020, and a display 2030. An example of the communication unit 2010 may be the communication unit 1320 shown in FIG. 1. As shown in FIG. 2, the one or more vehicle sensors 2020 may be configured to measure, for example, steering wheel angle, wheel velocity, longitudinal acceleration, brake pressure, total distance, and GPS velocity. The steering wheel angle may be measured in degrees (deg), the wheel velocity may be measured in revolutions per minute (rpm), the longitudinal acceleration may be measured in gravitational force (g), the brake pressure may be measured in atmospheric pressure (bar), the total distance may be measured by an odometer in kilometers (km), and the GPS velocity may be measured in kilometers per hour (kph). Each of these measurements may be sampled at least at 10 hertz (Hz). These measurements may be referred to herein as signals.

The communication unit 2010 includes a control module 2040, a geometrical model 2050, a machine learning model 2060, and a switch 2070. In some embodiments, the control module 2040 may be a supervisor, for example in the case where a support vector machine (SVM) is implemented as a multi-class classifier. The control module 2040 is configured to indicate when the calibration for the geometrical model 2050 is to be performed by transmitting a calibration start flag. The control module 2040 is also configured to transmit a first tire change flag when the first equipment tires have been changed.

The geometrical model 2050 is configured to receive GPS velocity and wheel velocity signals from the one or more vehicle sensors 2020. Upon initial startup of a vehicle equipped with a set of first equipment tires, motion of the vehicle triggers the control module 2040 to transmit a calibration start flag to the geometrical model 2050. The geometrical model 2050 receives the calibration start flag, and calculates a reference dynamic rolling radius (DRR) based on the GPS velocity and wheel velocity signals received from the one or more vehicle sensors 2020. The reference DRR may be stored when the calibration is complete, for example in memory 1340 shown in FIG. 1. After initial calibration, the geometrical model 2050 is also configured to calculate a DRR when a constant speed is reached, and compare the DRR to the reference DRR to estimate a tire tread wear. The estimated tire tread wear value may be output as a percentage, for example 100% for a new tire, 75% and 50% for intermediate tire wear, and 25% for a worn tire. These percentages are provided merely as an example, and any percentages from 100% for a new tire to 0% for a worn tire may be used. The estimated tire tread wear value is output to the switch 2070 and the machine learning model 2060.

The machine learning model 2060 may use an SVM as a multi-class classifier. The machine learning model 2060 is configured to receive wheel velocity steering wheel angle, brake pressure, longitudinal acceleration and total distance signals from the one or more vehicle sensors 2020. The machine learning model 2060 is configured to begin training upon receiving a learning flag from the geometrical model 2050. The geometrical model 2050 is used to train the machine learning model 2060. The machine learning model 2060 is configured to estimate a tire tread wear value and output the value to the switch 2070 as a percentage, for example 100% for a new tire, 75% and 50% for intermediate tire wear, and 25% for a worn tire. These percentages are provided merely as an example, and any percentages may be used. The machine learning model 2060 does not have any constant speed constraint, such as the geometrical model 2050, or any other condition or limitation to be respected.

The estimated tire tread wear value is output to the switch 2070. The switch 2070 may be a logical switch that is configured to control where the estimated tire tread value is generated, for example, the geometrical model 2050 may provide the estimated tire tread value to an end user for the entire life of the first equipment tires while the machine learning model 2060 may provide the estimated tire tread value to the end user after the first tire change. The switch 2070 is also configured to transmit the estimated tire tread value to the display 2030. The display 2030 may be an onboard vehicle display, a mobile device, a tablet, a personal digital assistant (PDA), a desktop computer, a laptop computer, or any suitable device. Examples of onboard vehicle displays include, and are not limited to, an instrument cluster display, a satellite navigation display, a head-up display, or a combination thereof.

Figure 3:
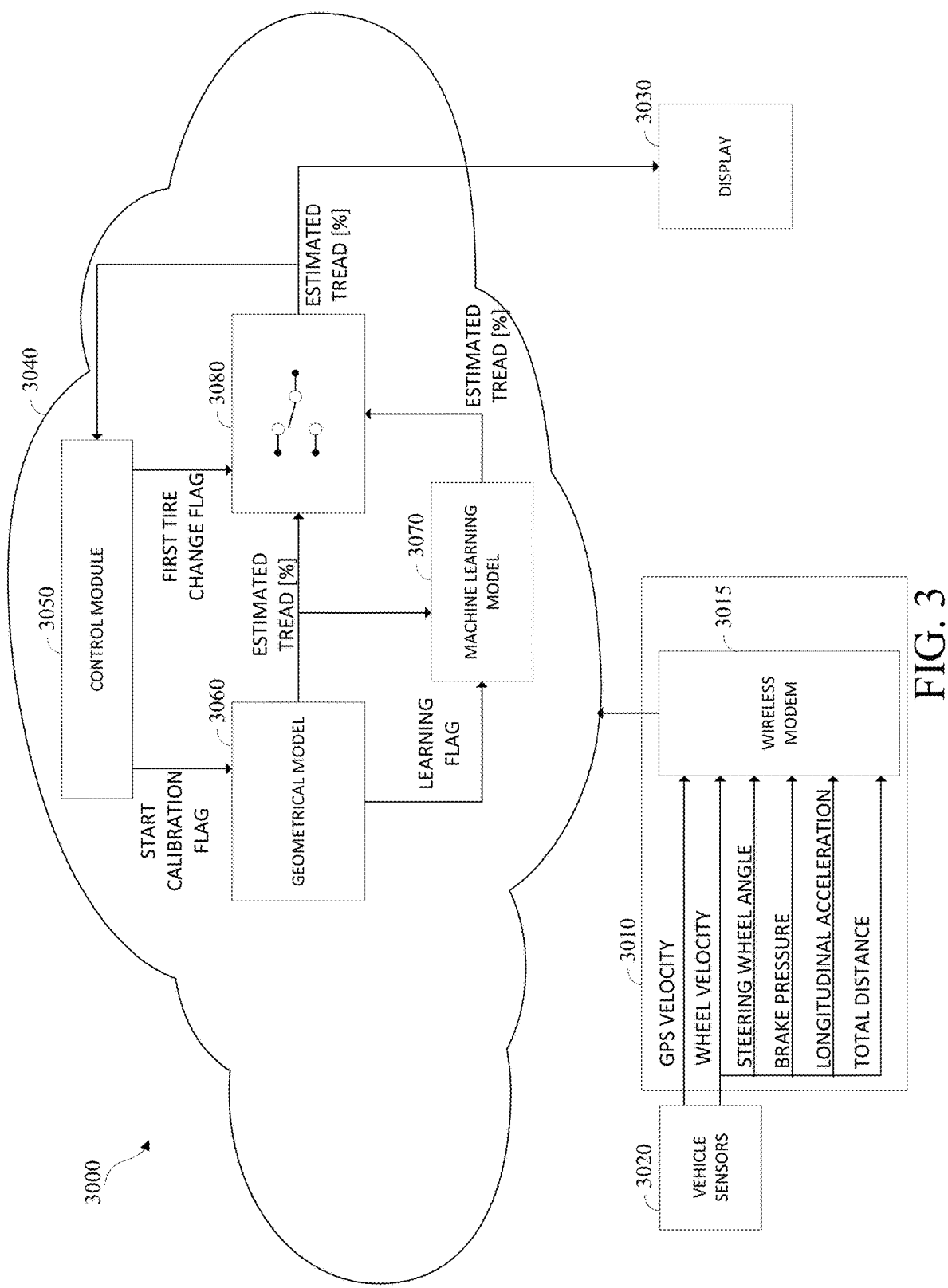
FIG. 3 is a diagram of another example of a portion of a vehicle communication system in which the aspects, features, and elements disclosed herein may be implemented.

FIG. 3 is a diagram of another example of a portion of a vehicle communication system 3000 in which the aspects, features, and elements disclosed herein may be implemented, for example in the vehicle 1000 shown in FIG. 1. In this example, the portion of the vehicle communication system 3000 includes a communication unit 3010, one or more vehicle sensors 3020, a display 3030, and a cloud component 3040. An example of the communication unit 3010 may be the communication unit 1320 shown in FIG. 1. As shown in FIG. 3, the one or more vehicle sensors 3020 may be configured to measure, for example, steering wheel angle, wheel velocity, longitudinal acceleration, brake pressure, total distance, and GPS velocity. The steering wheel angle may be measured in degrees (deg), the wheel velocity may be measured in revolutions per minute (rpm), the longitudinal acceleration may be measured in gravitational force (g), the brake pressure may be measured in atmospheric pressure (bar), the total distance may be measured by an odometer in kilometers (km), and the GPS velocity may be measured in kilometers per hour (kph). Each of these measurements may be sampled at least at 10 hertz (Hz). These measurements may be referred to herein as signals.

The communications unit 3010 includes a wireless modem 3015 configured to receive the GPS velocity, wheel velocity, steering wheel angle, brake pressure, longitudinal acceleration, and total distance signals from the one or more vehicle sensors 3020. The wireless modem 3015 is configured to transmit these signal to the cloud component 3040.

The cloud component 3040 may be a remote server that includes a control module 3050, a geometrical model 3060, a machine learning model 3070, and a switch 3080. In some embodiments, the control module 2040 may be a supervisor, for example in the case where a support vector machine (SVM) is implemented as a multi-class classifier. The control module 3050 is configured to indicate when the calibration for the geometrical model 3060 is to be performed by transmitting a calibration start flag. The control module 3050 is also configured to transmit a first tire change flag when the first equipment tires have been changed.

The geometrical model 3060 is configured to receive GPS velocity and wheel velocity signals from the wireless modem 3015 of the communication unit 3010. Upon initial startup of a vehicle equipped with a set of first equipment tires, motion of the vehicle triggers the control module 3050 to transmit a calibration start flag to the geometrical model 3060. The geometrical model 3060 receives the calibration start flag, and calculates a reference DRR based on the GPS velocity and wheel velocity signals received from the wireless modem 3015 of the communication unit 3010. The reference DRR may be stored when the calibration is complete, for example in memory 1340 shown in FIG. 1. After initial calibration, the geometrical model 3060 is also configured to calculate a DRR when a constant speed is reached, and compare the DRR to the reference DRR to estimate a tire tread wear. The estimated tire tread wear value may be output as a percentage, for example 100% for a new tire, 75% and 50% for intermediate tire wear, and 25% for a worn tire. These percentages are provided merely as an example, and any percentages from 100% for a new tire to 0% for a worn tire may be used. The estimated tire tread wear value is output to the switch 3080 and the machine learning model 3070.

The machine learning model 3070 may use an SVM as a multi-class classifier. The machine learning model 3070 is configured to receive wheel velocity steering wheel angle, brake pressure, longitudinal acceleration and total distance signals from the wireless modem 3015 of the communication unit 3010. The machine learning model 3070 is configured to begin training upon receiving a learning flag from the geometrical model 3060. The machine learning model 3070 is configured to estimate a tire tread wear value and output the value to the switch 3080 as a percentage, for example 100% for a new tire, 75% and 50% for intermediate tire wear, and 25% for a worn tire. These percentages are provided merely as an example, and any percentages may be used. The machine learning model 3070 does not have any constant speed constraint, such as the geometrical model 3060, or any other condition or limitation to be respected.

The estimated tire tread wear value is output to the switch 3080. The switch 3080 may be a logical switch that is configured to control where the estimated tire tread value is generated, for example, the geometrical model 3060 may provide the estimated tire tread value to an end user for the entire life of the first equipment tires while the machine learning model 3070 may provide the estimated tire tread value to the end user after the first tire change. The switch 3080 is also configured to transmit the estimated tire tread value to the display 3030. The display 3030 may be an onboard vehicle display, a mobile device, a tablet, a PDA, a desktop computer, a laptop computer, or any suitable device. Examples of onboard vehicle displays include, and are not limited to, an instrument cluster display, a satellite navigation display, a head-up display, or a combination thereof.

Figure 4:
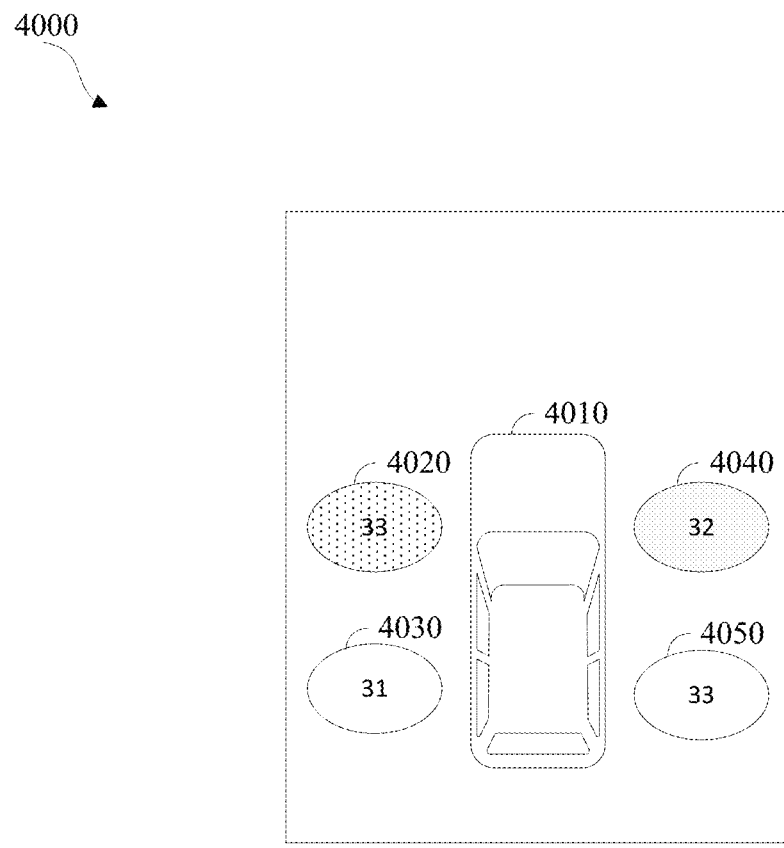
FIG. 4 is a diagram of an example display of the vehicle communication system.

FIG. 4 is a diagram of an example display 4000 of the vehicle communication system. As shown in FIG. 4, the display 4000 includes a graphical depiction of the vehicle 4010. The display 4000 also includes graphical representations of each of the tires of the vehicle. For example, tire 4020 is shown in a left front position, tire 4030 is shown in a left rear position, tire 4040 is shown in a right front position, and tire 4050 is shown in a right rear position. Each tire may include specific data for the tire, for example a tire pressure may be shown as a numeric value, an estimated tire wear value may be indicated by a color, or a combination thereof. Tire 4020 is shown in stippling to indicate a tire wear status in color. For example, tire 4020 may be displayed in yellow or any suitable color to indicate that the wear status of the tire is "intermediate." Tire 4040 is shown in shading to indicate a tire wear status in color. For example, tire 4040 may be displayed in red or any suitable color to indicate that the wear status of the tire is "high." Tires 4030 and 4050 may be displayed in green or any suitable color to indicate that the wear status of these tires is "low." The color schemes described here are merely provided as examples. Any color schemes and varying degrees of tire wear may be used.

Figure 5:
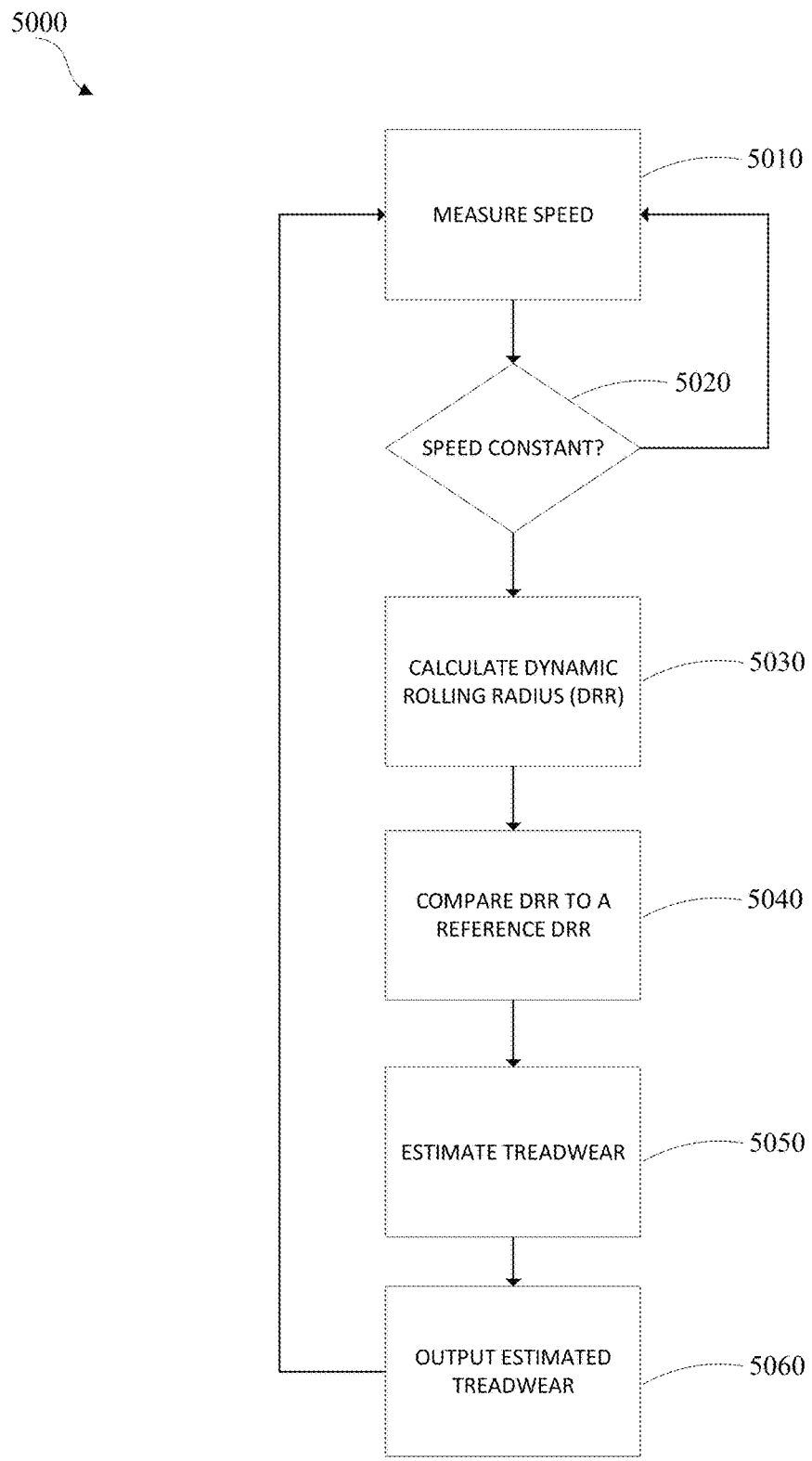
FIG. 5 is a flow diagram of an example of a method for use in a vehicle communication system configured to estimate tire tread wear in accordance with embodiments of this disclosure.

FIG. 5 is a flow diagram of an example of a method 5000 for use in a vehicle communication system configured to estimate tire tread wear in accordance with embodiments of this disclosure. The method 5000 shown in FIG. 5 is an example geometrical model method used in the vehicle communications systems of FIGS. 2 and 3. In this example, a vehicle is equipped with a new set of tires, i.e., first equipment tires. Once the vehicle is set in motion, the control module transmits a start calibration flag to the geometrical model. The geometrical model receives the calibration flag and begins calculating the DRR of each new tire.

To calculate the DRR of each new tire, the geometrical model measures the vehicle speed at operation 5010. At operation 5020, the geometrical model determines whether the vehicle speed is constant. If the vehicle speed is not constant, the geometrical model continues to measure the vehicle speed at operation 5010. If the vehicle speed is constant at operation 5020, the geometrical model calculates the DRR of each tire at operation 5030. The geometrical model calculates the DRR at constant speed for each tire using Equation (1) below:

$$\text{Dynamic Rolling Radius [meter]} = 60 \cdot \text{GPSspeed [kph]} / 7.2 \cdot \pi \cdot \text{WheelSpeed [rpm]} \quad \text{Equation (1)}$$

Once the geometrical model completes the calculation of the DRR for each tire 5030, the geometrical model transmits a learning flag to the machine learning model. From this moment onwards, the geometrical model calculates a DRR for each tire each time the vehicle speed is determined to be constant. At operation 5040, the geometrical model compares the calculated DRR for each tire with a reference DRR and estimates a tire tread wear value for each tire at operation 5050. The tire tread wear value for each tire is then output to the machine learning model and the user at operation 5060. The estimated tread wear value for each tire may be output as a percentage as described above.

Figure 6:
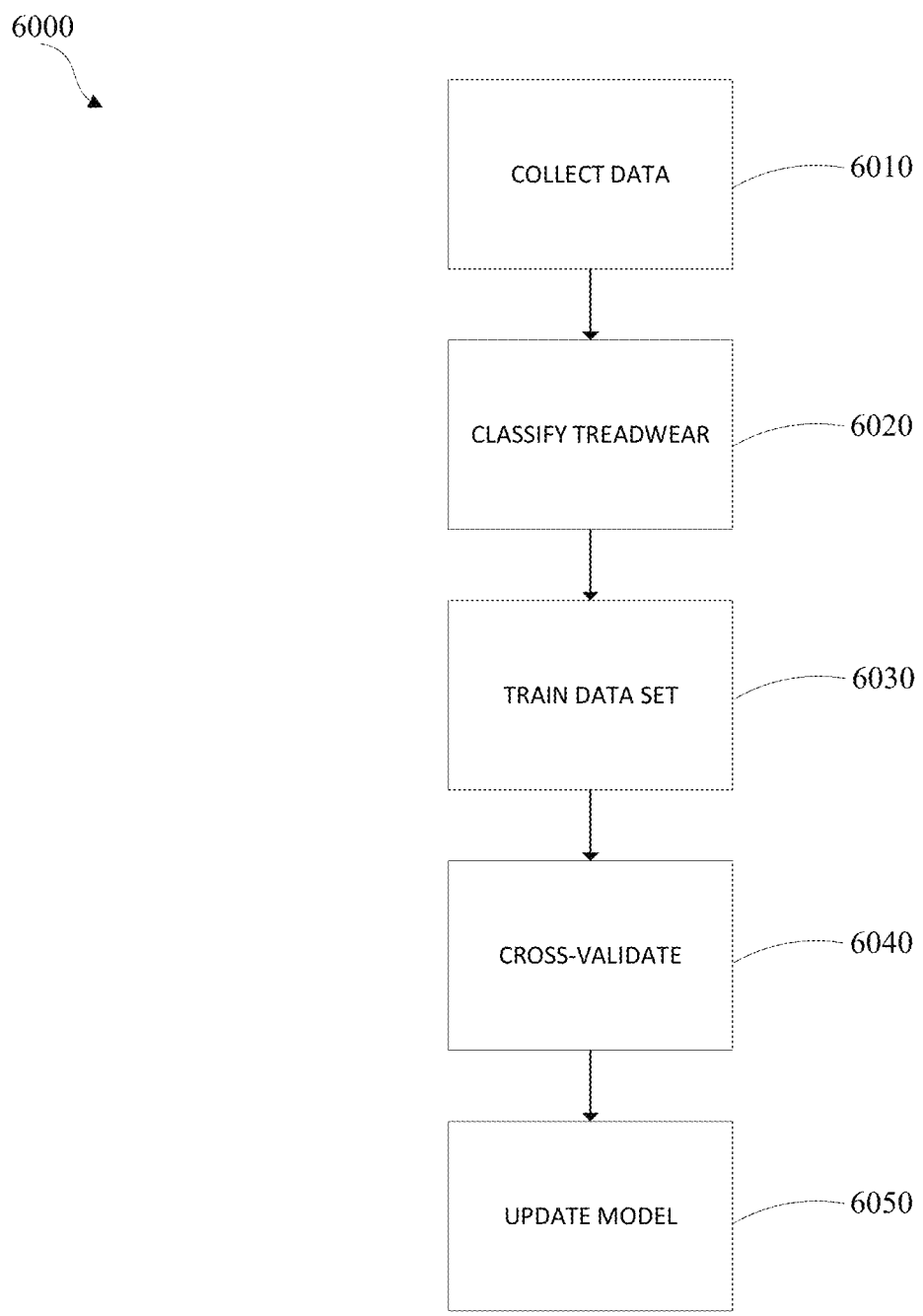
FIG. 6 is a flow diagram of an example of a method for use in a vehicle communication system configured to estimate tire tread wear in accordance with embodiments of this disclosure.

FIG. 6 is a flow diagram of an example of a method 6000 for use in a vehicle communication system configured to estimate tire tread wear in accordance with embodiments of this disclosure. The method 6000 shown in FIG. 6 is an example machine learning model method used in the vehicle communications systems of FIGS. 2 and 3.

In response to receiving the learning flag from the geometrical model, the machine learning model begins collecting data from the vehicle sensors at operation 6010. The machine learning model uses the collected data from the vehicle sensors and the output from the geometrical model to label the data instances with a tire tread state, for example, using supervised learning. The machine learning model collects and utilizes sensor data such as steering wheel angle, wheel velocity, longitudinal acceleration, brake pressure, and total distance, along with the output from the geometrical model to classify the tread wear for each tire at operation 6020. In some embodiments, the machine learning model may not use GPS velocity, however the better use of the other signals may produce additional context to the overall system and increase final accuracy of the estimated tread wear values. In the long run, using more sensor data may increase the output and accuracy. Considering that the machine learning model continuously collects data, while the geometrical model collects data at constant vehicle speed, an interpolation of the labels may be performed. The machine learning model may use a multi-class SVM with a radian kernel to determine a tire tread wear value into a group, for example 100%, 75%, 50%, or 25%.

At operation 6030, the machine learning model trains the data set. The training data set may include 75% of the entire data set, and 25% of this data set may be set out for testing. Upon completion of the training of the data set at operation 6030, the machine learning model performs a cross-validation of the data at operation 6040. In some embodiments, the cross-validation may be a 10 fold cross-validation. Once the classifier has been trained, an inference may be drawn from the machine learning model on the latest data to determine an estimated tire tread value, and the machine learning model is updated at operation 6050.

The control module triggers the system during the initial start, and when the first tire change occurs. For example, since the system is used when both the vehicle and the tires are new, the control module transmits the start calibration flag as soon as the vehicle is delivered to the driver at the dealership. In this example, the procedure is completely automatic and seamless from the perspective of the driver.

In order for the system to trigger the first tire change flag, the control module may continuously monitor the estimated tire tread wear output for each tire. When a discontinuity with an absolute value of the 50% or more is determined in the output, the control module determines that a tire has been changed and transmits the first tire change flag.

In some embodiments, when a tire rotation is performed, the system may generate a warning to indicate a new tire position, and the tire estimation may continue without interruption. Due to the nature of the system, the real-time calculation may be performed on-board a vehicle, in a cloud environment, or a combination thereof. In some embodiments, an on-board calculation where all the processing is performed may be displayed on a multimedia screen. In a cloud-based example where some or all of the processing is performed in the cloud, the output may be displayed on a multimedia screen of the vehicle or a mobile device, such as a smartphone. In some embodiments, the geometrical model may be performed on-board the vehicle while the machine learning model is performed in the cloud. In some embodiments, the tire pressure value may be added to the determination of the estimated tire tread wear calculations for the geometrical model, the machine learning model, or a combination thereof.

Some advantages of the system and methods described herein include the following. For example, the system and methods may be able to adopt a hybrid machine learning approach with increased precision without the need for additional sensors. In addition, the system and methods described herein are seamless from the perspective of the final user who does not have to interact with the system or manually measure the tire tread. After the calibration phase is performed, the system works with a very high precision as long as the tire size is not changed. The system performs a tire tread estimate at constant speed initially, and once the first tire change is performed, the tire tread values for each tire are continuously determined without any vehicle speed constraint. Testing of the geometrical model has shown an approximate accuracy of 91%. Once the machine learning model has been trained, testing has shown an approximate accuracy of 95%.

The above-described aspects, examples, and implementations have been described in order to facilitate easy understanding of the disclosure and are not limiting. On the contrary, the disclosure covers various modifications and equivalent arrangements included within the scope of the appended claims, which scope is to be accorded the broadest interpretation as is permitted under the law so as to encompass all such modifications and equivalent arrangements.

What is claimed is:

1. A tire tread wear system comprising:
a plurality of vehicle sensors; and
a processor comprising:
a control module configured to determine a tire event;
a geometrical model configured to collect data from the plurality of vehicle sensors to determine a dynamic rolling radius of a tire and output a tread wear estimation based on the dynamic rolling radius of the tire;
a machine learning model configured to collect data from the plurality of vehicle sensors and output a tread wear estimation based on a correlation of the tread wear estimation output from the geometrical model and a plurality of data instances with a tire tread state, wherein the geometric model is used to train the machine learning model; and
a logic switch configured to activate the geometrical model and the machine learning model.

2. The tire tread wear system of claim 1, wherein the control module is configured to activate the geometrical model based on a determination that the tire event is an initial tire setup.

3. The tire tread wear system of claim 2, wherein the logic switch is configured to activate the machine learning model on a condition that the control module determines that the tire event is a tire change.

4. The tire tread wear system of claim 3, wherein the logic switch is configured to deactivate the geometrical model.

5. The tire tread wear system of claim 1, wherein the geometrical model is configured to collect data on a condition that the vehicle is at a constant speed.

6. The tire tread wear system of claim 1, wherein the machine learning model is configured to collect data continuously and independently from a speed of the vehicle.

7. The tire tread wear system of claim 1, wherein the data collected by the geometrical model includes global positioning system (GPS) data and wheel velocity data.

8. The tire tread wear system of claim 1, wherein the data collected by the machine learning model includes at least one of wheel velocity data, steering wheel angle data, brake pressure data, longitudinal acceleration data, or total distance data.

9. The tire tread wear system of claim 1, wherein the machine learning model utilizes a multi-class support vector machine (SVM) with a radian kernel to predict the tire tread state and classify the tire tread state into a plurality of groups.

10. The tire tread wear system of claim 9, wherein a first group of the plurality of groups is 100% tread remaining, a second group of the plurality of groups is 75% tread remaining, a third group of the plurality of groups is 50% tread remaining, and a fourth group of the plurality of groups is 25% tread remaining.

11. A tire tread wear system comprising:
a plurality of vehicle sensors;
a processor comprising:
a control module configured to determine a tire state of a vehicle;
a geometrical model configured to collect data from the plurality of vehicle sensors to determine a dynamic rolling radius of a tire and output a tread wear estimation based on the dynamic rolling radius of the tire;
a machine learning model that is trained using the geometric model, the machine learning model configured to collect data from the plurality of vehicle sensors and output a tread wear estimation based on a correlation of the tread wear estimation output from the geometrical model and a plurality of data instances with a tire tread state;
a logic switch configured to activate the geometrical model and the machine learning model; and
a display configured to:
receive the geometrical model tread wear estimation and the machine learning model tread wear estimation;
generate a visualization for the tire based on the geometrical model tread wear estimation and the machine learning model tread wear estimation; and
display the generated visualization for the tire.

12. The tire tread wear system of claim 11, wherein the control module is configured to activate the geometrical model based on a determination that the tire event is an initial tire setup.

13. The tire tread wear system of claim 12, wherein the logic switch is configured to activate the machine learning model on a condition that the control module determines that the tire event is a tire change.

14. The tire tread wear system of claim 13, wherein the logic switch is configured to deactivate the geometrical model.

15. The tire tread wear system of claim 11, wherein the data collected by the geometrical model includes global positioning system (GPS) data and wheel velocity data.

16. The tire tread wear system of claim 11, wherein the data collected by the machine learning model includes at least one of wheel velocity data, steering wheel angle data, brake pressure data, longitudinal acceleration data, or total distance data.

17. The tire tread wear system of claim 11, wherein the machine learning model utilizes a multi-class support vector machine (SVM) with a radian kernel to predict the tire tread state and classify the tire tread state into a plurality of groups.

18. The tire tread wear system of claim 17, wherein a first group of the plurality of groups is 100% tread remaining, a second group of the plurality of groups is 75% tread remaining, a third group of the plurality of groups is 50% tread remaining, and a fourth group of the plurality of groups is 25% tread remaining.

19. A tire tread wear system comprising:
   a plurality of vehicle sensors;
   a wireless modem configured to transmit data from the plurality of sensors;
   a server configured to receive the data from the wireless modem, the server comprising:
      a control module configured to determine a tire state of a vehicle;
      a geometrical model configured to collect data from the plurality of vehicle sensors to determine a dynamic rolling radius of a tire and output a tread wear estimation based on the dynamic rolling radius of the tire;
      a machine learning model that is trained using the geometric model, the machine learning model configured to collect data from the plurality of vehicle sensors and output a tread wear estimation based on a correlation of the tread wear estimation output from the geometrical model and a plurality of data instances with a tire tread state; and
      a logic switch configured to activate the geometrical model and the machine learning model.

* * * * *